United States Patent
Steinmetz et al.

(10) Patent No.: US 8,581,701 B2
(45) Date of Patent: Nov. 12, 2013

(54) RFID-BASED DATA COLLECTION, CORRELATION AND TRANSMISSION SYSTEM, AND METHOD FOR COLLECTING DATA AND CORRELATING SAME TO SYSTEM PARTICIPANT IDENTITIES AND ACTIONS THEREOF

(75) Inventors: Jay Steinmetz, Baltimore, MD (US); William J Poulsen, Baltimore, MD (US)

(73) Assignee: Barcoding, Inc., Baltimore, MD (US)

( * ) Notice: Subject to any disclaimer, the term of this patent is extended or adjusted under 35 U.S.C. 154(b) by 609 days.

(21) Appl. No.: 12/786,347

(22) Filed: May 24, 2010

(65) Prior Publication Data

US 2011/0285502 A1 Nov. 24, 2011

(51) Int. Cl.
*H04Q 5/22* (2006.01)
*G05B 19/00* (2006.01)
*G06F 7/00* (2006.01)
*H04B 1/00* (2006.01)

(52) U.S. Cl.
USPC ....... 340/10.1; 340/10.2; 340/10.3; 340/10.5; 340/5.61

(58) Field of Classification Search
USPC ......... 340/10.1–10.5, 5.61; 705/14.58, 14.42, 705/14.66; 709/217; 707/723, 769, 732, 707/767; 455/456.1, 41.1
See application file for complete search history.

(56) References Cited

U.S. PATENT DOCUMENTS

| | | | |
|---|---|---|---|
| 5,979,757 A * | 11/1999 | Tracy et al. | 235/383 |
| 6,578,675 B2 * | 6/2003 | Wilson et al. | 187/391 |
| 6,587,835 B1 * | 7/2003 | Treyz et al. | 705/14.64 |
| 6,677,852 B1 * | 1/2004 | Landt | 340/10.1 |
| 6,988,071 B1 * | 1/2006 | Gazdzinski | 704/275 |
| 7,209,807 B2 * | 4/2007 | Smith et al. | 701/1 |
| 7,616,095 B2 * | 11/2009 | Jones et al. | 340/10.5 |
| 7,772,978 B1 * | 8/2010 | Somogyi et al. | 340/572.4 |
| 8,069,169 B2 * | 11/2011 | Fitzpatrick et al. | 707/732 |
| 8,207,851 B2 * | 6/2012 | Christopher | 340/568.1 |
| 8,260,948 B2 * | 9/2012 | Chand et al. | 709/231 |
| 2003/0157933 A1 * | 8/2003 | Watanabe et al. | 455/435 |
| 2009/0256683 A1 | 10/2009 | Stephenson et al. | |
| 2010/0268607 A1 * | 10/2010 | Rodriguez et al. | 705/14.58 |
| 2011/0093339 A1 * | 4/2011 | Morton | 705/14.58 |

* cited by examiner

*Primary Examiner* — Nam V Nguyen
(74) *Attorney, Agent, or Firm* — Hunter Clark PLLC (57) ABSTRACT

An RFID-based data collection, correlation and transmission system and method carried out thereby is provided. The system, which comprises one or more RFID-readers, a radio frequency identification (RFID) recognition and control component. a storage device interface, a portable and/or internal data storage device in communication with the storage device interface, one or more antennas, and a configuration and command component, is operable to collect data of interest from detected RFID tags, and detect and identify system participants and data related thereto. In addition, the system is operable to correlate potential data of interest, such as product advertising information, to the detected system participants, and transmit the data of interest to the system participants via numerous methods of communication. Thus, the system provides a means of highly targeted information distribution, as well as providing user reports valuable in future planning.

27 Claims, 5 Drawing Sheets

RFID-BASED DATA COLLECTION, CORRELATION AND TRANSMISSION SYSTEM, AND METHOD FOR COLLECTING DATA AND CORRELATING SAME TO SYSTEM PARTICIPANT IDENTITIES AND ACTIONS THEREOF

FIELD OF THE INVENTION

An RFID-based data collection, correlation and transmission system and method carried out thereby is provided, which enables a user to easily preprogram the system to collect data of interest, and detect and identify system participants and data related thereto. In addition, the system may correlate potential data of interest to the detected participants via correlative functions, and transmit the data of interest to the participants instantly via video presentation, as well as other conventional means such as electronic mail.

DESCRIPTION OF THE RELATED ART

Radio frequency identification (RFID) systems are now being employed in an ever increasing range of applications. For example, RFID systems have been used in supply chain management applications to identify and track merchandise throughout manufacture, warehouse storage, transportation, distribution, and retail sale. RFID systems have also been used in security applications to identify and track personnel for controlling access to restricted areas of buildings and plant facilities, thereby controlling access to such areas. Accordingly, RFID systems have been increasingly employed in diverse applications to facilitate the identification and tracking of merchandise, personnel, and other items and/or individuals that need to be reliably monitored and/or controlled within a particular environment.

A conventional RFID system typically includes at least one RFID transponder or tag, at least one RFID reader, and at least one controller or host computer. For example, in a manufacturing environment, RFID tags can be attached to selected items of manufacture or equipment, and at least one RFID reader can be deployed in the environment to interrogate the tags as the tagged items pass predefined points on the manufacturing floor. In a typical mode of operation, the reader transmits a radio frequency (RF) signal in the direction of a tag, which responds to the transmitted RF signal with another RF signal containing information identifying the item to which the tag is attached, and possibly other data acquired during the manufacture of the item. The tag may also include at least one integrated transducer or environmental sensor for providing data such as the temperature or humidity level of the ambient environment. The reader receives the information and data transmitted by the tag, and provides the tag data to the host computer for subsequent processing. In this typical operating mode, the reader can be configured as a peripheral connected to a serial port of the host computer.

Further, RFID readers are now capable of being connected via a communications network to enterprise computer resources running one or more RFID-enabled client software applications. Such readers have been deployed in complex systems including many readers (e.g., greater than 10) connected via one or more communications networks to a number of host computers, which may be part of an enterprise network server. Such host computers can run client applications for processing tag data to control access to building and plant facilities, the movement of personnel and property, the operation of lighting/heating/ventilation/air conditioning facilities, and/or other diverse functions.

Whether implemented as computer peripherals or networked devices, conventional RFID readers generally collect data from RFID tags much like optical barcode readers collect data from barcode labels. However, whereas an optical barcode reader typically requires a direct line of sight to a barcode label to read the data imprinted on the label, the RF signals employed by the typical RFID reader can penetrate through and/or diffract around objects obstructing an RFID tag from the RF field of view of the reader, thereby allowing the reader to access data from a tag that, for example, might be buried beneath one or more boxes of merchandise. In addition, unlike the optical barcode reader, the conventional RFID reader can operate on and distinguish between multiple RFID tags within the field of the reader.

In conventional RFID systems that employ passive tags, each RFID reader typically follows a predefined sequence or protocol to interrogate and retrieve data from one or more RFID tags within the RF field of the reader (also known as the interrogation zone of the reader). It is noted that the interrogation zone of a reader is generally determined by the physical positioning and orientation of the reader relative to the tags, and the setting of various parameters (e.g., the transmit power) employed by the reader during the interrogation sequence. In systems employing passive tags, the interrogation zone is typically defined by the power coupling zone.

For example, a typical interrogation sequence performed by an RFID reader includes transmitting a CW (continuous wave) to one or more passive tags within the reader's interrogation zone to power the tags, and transmitting a message packet (e.g., a request or command) by modulating the carrier signal. The passive tag then reads the message packet while tapping some of the energy of the CW to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the CW, and reflects a portion of the modulated wave back to the reader by changing the reflection characteristics of its antenna via a technique known as backscatter modulation. In the event the interrogation sequence is employed in a system including active tags, the target active tag generates and transmits an appropriate response to the reader.

During the typical interrogation sequence described above, the reader is tuned to detect changes in the small signals reflected from the antennae of the passive tags, or to receive the responses generated and transmitted by the active tags. In the event the reader detects changes in signal reflections or receives responses from more than one tag in response to a message packet, the reader refines the identification (e.g., the address) of the target of the message in an iterative manner until only one tag provides data or information in response to the request or command contained within the packet. For example, the tag address may be an electronic product code (EPC). This process of iterative refinement of the communication between an RFID reader and a selected one of a plurality of RFID tags within the reader's interrogation zone is known as singulation. Conventional singulation algorithms typically employ techniques similar to binary tree searches or randomized transmission delay techniques.

After the reader has confirmed the presence of and received data from the targeted tag, it may send another message packet to a next tag until all of the tags within its interrogation zone have been addressed. It is noted that some conventional interrogation protocols allow the creation of alias addresses for tags so that the reader is not required to transmit the actual tag address, which may carry private information. For example, a tag can indicate to the reader how its alias tag address is related to its actual tag address via the backscatter transmission. Further, the relationship between the alias address and the actual address can change each time the reader addresses that tag. The reader then typically sends the data provided by the tags to the host computer for subsequent processing.

However, the conventional RFID systems described above have a number of drawbacks.

First, as mentioned above, conventional RFID systems are generally controlled by a main (host) computer. In particular, as disclosed in U.S. Patent Publication 2009/0256683, mid-level controllers/processors are generally utilized to schedule, parameterize and coordinate RF transmissions generated by the RFID readers, to receive tag data from the RFID readers, and to receive and transmit raw and processed tag data to the host data, etc. Importantly, conventional RFID systems, as disclosed therein, utilize complex controllers/systems to control operation of the RFID readers, control processing of the collected raw data, and control how the processed data is stored and transmitted. Such conventional systems, thus, require user expertise, and are generally inflexible with regards to data collection processes, preferences, etc.

Second, conventional RFID systems are mainly concerned with the collection of data from RFID tags, and determination of correspondent movement and location of personnel, merchandise, vehicles, etc., as described above. However, conventional RFID systems are generally incapable of utilizing the collected RFID tag data, in combination with sensor data, to transmit data to detected entities in real time, thereby providing directed advertising/information presentation to participants.

In view of the deficiencies of the conventional RFID systems as described above, it is an object of the present invention to provide an easily programmable, flexible RFID-based data collection, correlation and transmission system operable to permit a user to easily preprogram the system to collect selected raw RFID tag data and process same, thereby detecting and identifying system participants and data related thereto.

It is a further object of the present invention to provide the system of the present invention mentioned above with the ability to receive and process sensor data, correlate processed RFID tag data and received sensor data to the detected participants, and transmit selected data to the system participants instantly via video presentation, as well as other conventional means such as electronic mail.

SUMMARY OF THE INVENTION

In order to achieve the objects of the present invention, the present inventors endeavored to develop an RFID-based data collection, correlation and transmission system which may be assembled quickly, easily programmed by any user, and operable to collect data in desired formats and transmit data to system participants, such as highly tailored directed advertising based on the unique characteristics of the system participants. Accordingly, in a first main embodiment of the present invention, an electronic data collection system is provided comprising:

(a) one or more RFID readers operable to obtain/receive electronic data from passive and/or active RFID tags;

(b) a radio frequency identification (RFID) recognition and control component (generally a computer microprocessor) operable to control operation of the RFID readers, receive information transmitted from an RFID tag, selectively filter/convert said received information according to a preset configuration command set, and transmit the filtered/converted information, the RFID recognition and control component being in communication with one or more of the RFID readers;

(c) a storage device interface in communication with the RFID recognition and control component;

(d) a portable and/or internal data storage device in communication with the storage device interface;

(e) one or more antennas in communication with the one or more RFID readers; and (f) a configuration and command component operable to compile a configuration command set readable by the RFID recognition and control component, the configuration command set comprised of one or more RFID operation paramaters and one or more data format types.

Preferably, the portable and/or internal data storage device is operable to query the radio frequency identification (RFID) recognition and control component for a subset of the collected data. Further, the system of the first main embodiment may further comprise further comprise one or more graphical user displays in communication with the RFID recognition and control component, as well as audio components and additional video displays.

In a preferred embodiment of the present invention, the electronic data collection system of the first main embodiment above is provided, further comprising a data storage medium in communication with the RFID recognition and control component.

In a another preferred embodiment of the present invention, the electronic data collection system of the first main embodiment above is provided, further comprising a geographic location determination means in communication with the RFID recognition and control component.

In a further preferred embodiment of the present invention, the electronic data collection system of the first main embodiment above is provided, wherein the RFID recognition and control component comprises an electronic control and data processing module operable to execute the configuration command set in conjunction with the RFID readers.

In yet another preferred embodiment of the present invention, the electronic data collection system of the first main embodiment above is provided, wherein the configuration command set is a computer program product comprising computer usable program code embodied on the portable and/or internal data storage device for controlling operation of the RFID readers and processing of information obtained therefrom. This computer program product comprises computer usable program code operable to:

(a) enable establishment of one or more RFID reader operational parameters, said parameters comprised of RF (radio frequency) power level, read range, permitted interrogation sources, scan delay, desired data type, run state (auto or manual) and time zone;

(b) enable establishment of one or more data files;

(c) enable establishment of desired data types and/or formats to be stored in each data file; and (d) communicate the RFID reader operation parameters to the RFID recognition and control component.

In a further preferred embodiment, the configuration command set computer usable program code of the fifth embodiment above is further operable to enable establishment of data fields within each data file for organization of data therein. Further, the configuration command set computer usable program code of the fifth embodiment above is further operable convert data received from the RFID recognition and control component into other data types and/or formats.

In a second main embodiment of the present invention operable to correlate collected data with system participant(s) so as to identify selected data to transmit/present to the system participant(s), the electronic data collection system of the first main embodiment above is provided, further comprising:
(a) one or more sensory detection means for collecting detected sensory information selected from the group consisting of a microphone, camera, temperature sensor, distance sensor, ocular detection and tracking means, and tactile sensors in communication with the RFID recognition and control component; and
(b) a user identity and presentation data correlation component comprising:
(i) computer usable program code operable to associate the detected sensory information with one or more detected RFID tags;
(ii) computer usable program code operable to associate the detected RFID tags with one or more assigned users (system participants) thereof;
(iii) computer usable program code operable to correlate the detected sensory information with associated presentation data; and
(iv) computer usable program code operable to correlate the one or more assigned users with the associated presentation data.

In a preferred embodiment, the user identity and presentation data correlation component further comprises computer usable program code operable to compile a visitor report comprising the associated presentation data. Further, the user identity and presentation data correlation component may further comprise computer usable program code operable to transmit the visitor report to the one or more assigned users In a further preferred embodiment, the electronic data collection system of the second main embodiment above further comprises a video display means in communication with the radio frequency identification (RFID) recognition and control component; and
computer usable program code operable to compare the detected sensory information to a database file of stored graphic and audio data, determine correlative graphic and audio data, and communicate the determined correlative graphic and audio data to the video display means.

In a third main embodiment of the present invention, a data collection method for utilization in an RFID-base system is provided comprising the steps of:
(a) establishing one or more data collector operational parameters, said parameters comprised of RF (radio frequency) power level, read range, permitted interrogation sources, scan delay, desired data type, run state (auto or manual) and time zone;
(b) establishing of one or more data files;
(c) establishing desired data types and/or formats to be stored in each data file;
(d) initiating one or more data collection reads corresponding to the one or more data collection reader operational parameters; and
(e) storing data collected in the one or more data collection reads.

The data collection method described above further preferably comprises the step of establishing data fields within each data file for organization of data therein.

In another preferred embodiment, the data collection method of the third main embodiment above is provided, further comprising converting the stored data into other data types and/or formats.

In yet another preferred embodiment, the data collection method of the third main embodiment above is provided, further comprising:
collecting detected sensory information from an interrogation source selected from the group consisting of audio, video, temperature, distance of interrogation source from data reader, target ocular movement and direction characteristics, and tactile sensory data; and
associating the detected sensory information with one or more data sources.

In a further preferred embodiment, the data collection method of the third main embodiment above is provided, comprising the further steps of
storing exhibit information and characteristics thereof, including location and subject matter thereof;
determining the identity of stored exhibit information corresponding to detected sensory information; and
compiling a user report comprising exhibit information viewed (by the system participant) and/or requested by the interrogation source (RFID passive and/or active tag(s)).

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

As utilized in this application, terms "component," "module," "system," "controller," "device," and variants thereof are intended to refer to a computer-related entities, either hardware, a combination of hardware and software, software, or software in execution. For example, a component, module, etc., may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The subject invention facilitates collection of electronic data (e.g., participant identity, time, location, etc.) obtained by Radio Frequency Identification (RFID) readers from RFID tags, as well as sensor data from sensors in communication with the system, and transmission of such data to computers, servers, etc., such as the RFID recognition and control component of the present system. The system collects, processes, and stores electronic data, and provides predetermined data to users of the system based on the stored electronic data, so as to provide users of the system with predetermined data in preselected format types. Such data can include unprocessed (e.g., raw data) and/or processed (e.g., filtered and formatted) electronic information as described in detail below. The components can execute in connection with one or more video and/or microprocessor-based devices such as a computer, a flat panel video screen, a logic-based device, etc.

The interfaces between system component can be based on wire and/or wireless technologies, and suitable technologies include Ethernet (e.g., 10BASE-T, 100BASE-T and 1000BASE-T), serial port (e.g., RS-232 and RS-422), parallel port, coaxial cable, Universal Serial Bus (USB), Firewire, and the like.

The subject invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is to be appreciated that the components and modules of the present invention can be software and/or hardware based. For example, these components can be implemented in essentially any programming language, such as, for example, C or Java based languages. In addition, a markup language such as Extensible Markup Language (XML) and/or Physical Markup Language (PML) can be utilized to define a system configuration, which can include information on mapping between logical-physical readers, available filters, etc.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 1:
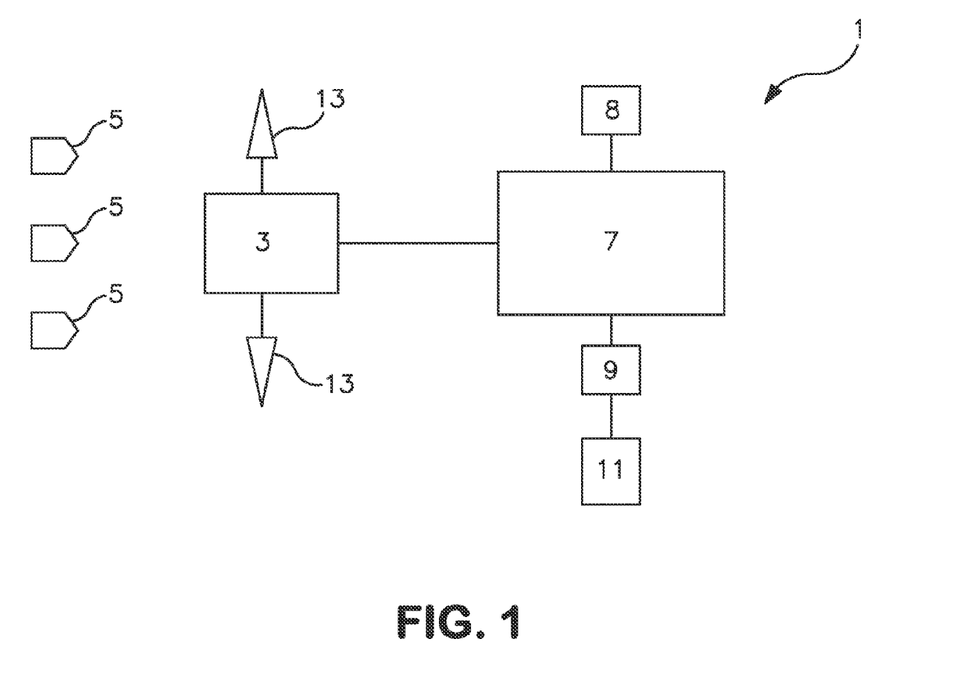
FIG. 1 is a box diagram of the first main embodiment of the present invention, illustrating the connectivity of the system components.

As illustrated in FIG. 1, an electronic data collection system 1 is provided, comprising one or more RFID readers 3 operable to obtain/receive electronic data from passive or active RFID tags 5. Further, the system 1 comprises a radio frequency identification (RFID) recognition and control component 7 in communication with one or more of the RFID readers 3. The radio frequency identification (RFID) recognition and control component 7 is operable to control operation of the RFID readers 3, receive information transmitted from RFID tags 5, selectively filter/convert the received information according to a preset configuration command set, and transmit the filtered/converted information.

Figure 2:
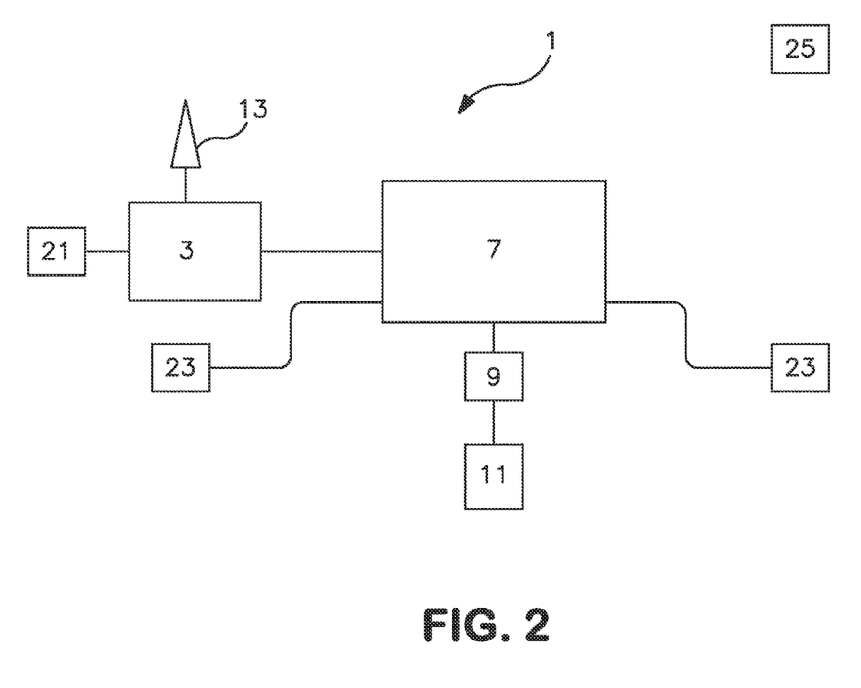
FIG. 2 is a box diagram of the second main embodiment of the present invention, illustrating the connectivity of the system components, including the sensors and video display.

Transmission of the filtered/converted information may be performed via wired communication. For example, the filtered/converted information may be transmitted to a data storage device 11, as illustrated in FIG. 1. Alternatively, the system 1 may be configured such that the radio frequency identification (RFID) recognition and control component 7 is provided with wireless communication capability, thereby enabling the component 7 to wirelessly transmit the filtered/converted information to a remotely located data storage device, system, computer processor, etc. Further, in a preferred embodiment, the system is configured to transmit the filtered/converted information to both the data storage device 11 in physical connection with the system 1, as well as wirelessly transmit the filtered/converted information to a remote source 25, as illustrated in FIG. 2, thereby providing a reliable data storage backup functionality.

Preferably, the RFID recognition and control component comprises an electronic control and data processing module, such as a computer, microprocessor, etc. operable to execute the configuration and command set (described below) in conjunction with the RFID readers 3. Although not required, in a further preferred embodiment, as illustrated in FIG. 1, a data storage medium 8 may be provided in communication with the RFID recognition and control component 7.

One or more storage device interfaces 9 is provided in communication with the RFID recognition and control component 7. The storage device interface(s) may be any interface desired by users, as long as it is compatible with storage devices to be utilized in the system. Preferably, the storage device interface is a USB drive interface, the current most widely used interface in the industry, but may be any current or future interface operable to enable communication of the (RFID) recognition and control component 7 with storage devices of interest.

The system 1 further comprises one or more portable and/or internal data storage devices 11 in communication with the storage device interface 9. The portable and/or internal storage device 11 may be any of a removable/non-removable, volatile/non-volatile computer storage media, such as a magnetic disk drive, floppy disk drive, tape drive, Jaz drive, Zip drive, LS-100 drive, flash memory card, memory stick, separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

Preferably, the storage device 11 is one or more of a USB flash drive, SD card, memory stick, and portable hard drive. However, as with the storage device interface, the portable and/or internal data storage devices 11 may be any current or future interface operable to communicate with the (RFID) recognition and control component 7, including a remote storage device 25 accessible through a wired or wireless data connection as mentioned above, and as illustrated in FIG. 2. Preferably, the portable and/or internal data storage device is operable to query the radio frequency identification (RFID) recognition and control component 7 for a subset of the collected data.

As illustrated in FIGS. 1 and 2, one or more antennas 13 are provided in communication with the one or more RFID readers 3. The antennas 13 enable transmission and reception of RF signals by the RFID readers 3. The antennas 13 may be any conventional antenna operable to perform this function.

Figure 3:
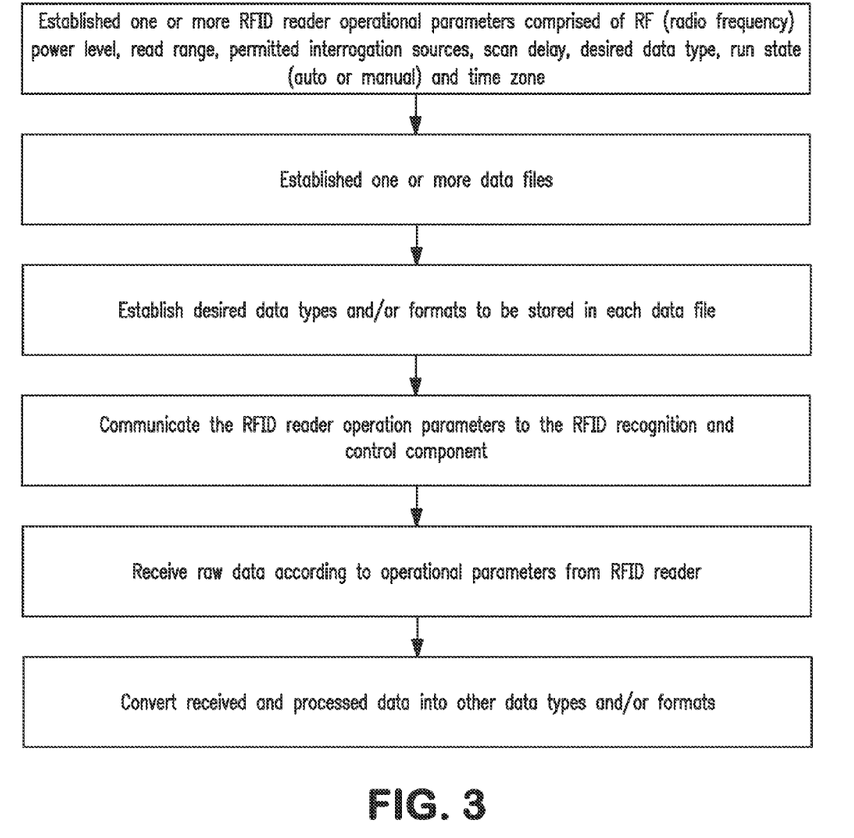
FIG. 3 is a flow chart illustrating the steps taken in carrying out the electronic data collection method of the present invention.

Further, a configuration and command component is provided, the functions of which are illustrated in FIG. 3. The configuration and command component, preferably exemplified by computer software, is operable to compile a configuration command set readable by the RFID recognition and control component 7. The configuration command and control component is comprised of one or more RFID operation parameters and one or more data format types, such that a user may specify how the RFID readers operate and collect data, and data formats that the collected raw data should be converted to for transmission to the user.

Preferably, the configuration and command component comprises a computer program product comprising computer usable program code embodied on the portable and/or internal data storage device for controlling operation of the RFID readers and processing of information obtained therefrom. Further, preferably, the RFID recognition component comprises an electronic control and data processing module operable to execute the configuration command set in conjunction with the RFID readers.

Specifically, the configuration and command component computer program product comprises computer usable program code operable to (a) enable establishment of one or more RFID reader operational parameters comprised of RF (radio frequency) power level, read range, permitted interrogation sources, scan delay, desired data type, run state (auto or manual) and time zone; (b) enable establishment of one or more data files; (c) enable establishment of desired data types and/or formats to be stored in each data file; and (d) communicate the RFID reader operation parameters to the RFID recognition and control component. Further, preferably, the configuration and command component is operable to convert received and processed data into other data types and/or formats, as desired by the user. Thus, operation of the RFID readers, as well as how the collected data is converted and stored, is programmable by the user via the configuration and command component.

In another preferred embodiment, the configuration and command component computer usable program code is further operable to enable establishment of data fields within each data file for organization of data therein. For example, a user may instruct the system, via the configuration and command component, to establish specified data field within each data file, and therefore separate and organize collected data into distinct groupings for ease of processing and viewing by the user.

Figure 5:
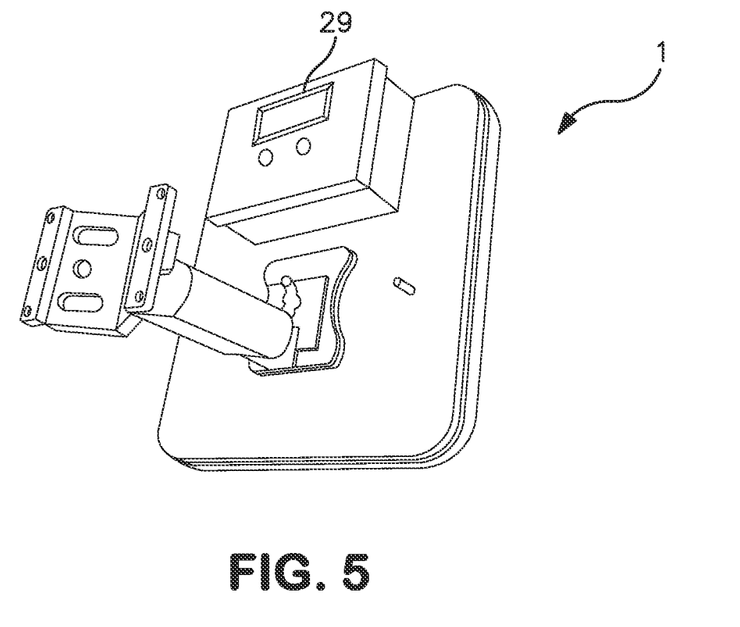
FIG. 5 is a rear perspective view of an exemplary embodiment of the system of the present invention.

In a preferred embodiment, as illustrated in FIG. 5, a graphical user display 29 may be provided in communication with the RFID recognition and control component. The graphical user display 29 may be any means of displaying system data, such as power status, RFID parameters, read status, etc., to a user. Preferably, as shown in FIG. 5, the graphical user display 29 is an LCD display, but may be configured in any manner appropriate to display desired system data to the user.

In instances where the physical (geographic) location of the RFID readers 3 is desired, a preferred embodiment of the system of the present invention is provided wherein a geographic location determination means is provided in communication with the RFID recognition and control component. In particular, as illustrated in FIG. 2, a geographic location determination means is in communication with one or more of the RFID readers 3, so as to be operable to determine the location of the one or more RFID readers 3. The geographic location determination means may be a GPS, a triangulation device, an optical device, a magnetic compass interface, and/ or a location input means (for enabling input of the location of the RFID readers 3 by a user).

Figure 4:
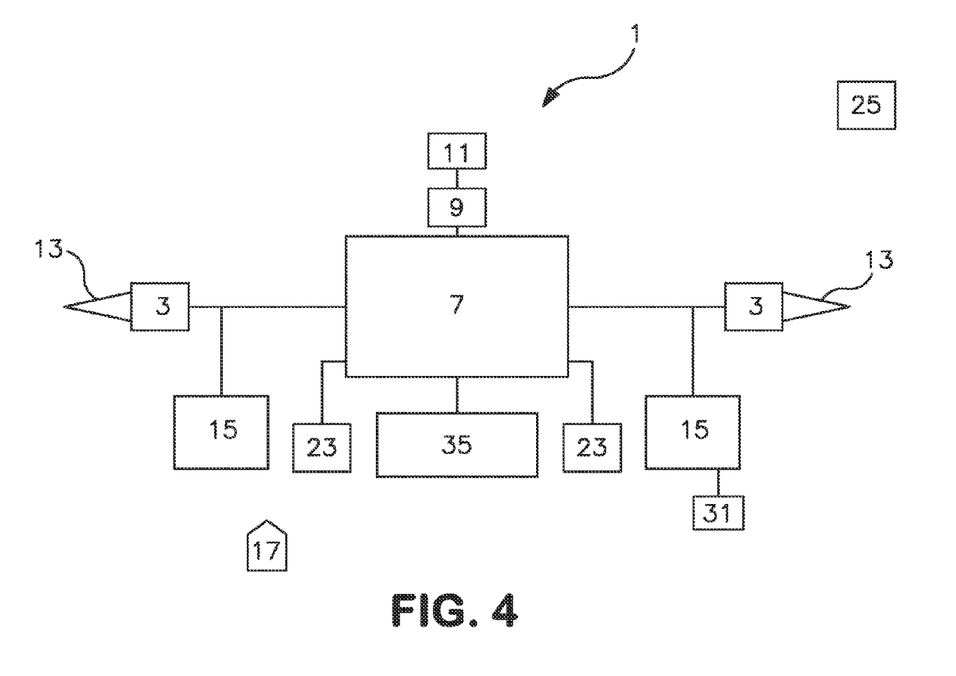
FIG. 4 is a box diagram of an exemplary embodiment of the present invention, wherein the system is deployed in a convention display area.

In an exemplary embodiment, as illustrated in FIG. 4, the system 1 of the present invention has several RFID readers 3 in communication therewith, and is deployed in a convention display area. In this embodiment, the geographic location determination means is a location input means (rather than a GPS, which has difficulty operating indoors) comprised of computer application program code operable to enable a user to input the location of each RFID reader 3 with relation to convention presentation data. Specifically, in such an exemplary embodiment, a user may input the location of each RFID reader 3 with respect to a component within the system 1, such as a particular advertising display 15 within the display area. Thus, when an RFID tag 17 worn by a system participant in a badge is detected by the RFID reader 3, the system is operable to determine that the system participant is positioned adjacent the particular advertising display 15. Accordingly, it may be presumed that the system participant wearing the RFID tag 17 was viewing the advertising display 15, and the system may further record the time period viewed, the system participant data, etc.

In the second main embodiment of the present invention, as illustrated in FIG. 2, the electronic data collection system 1 described above is provided, further comprising one or more sensory detection means 23 which are operable to collect/ sense detected information (sensory information). These sensory detection means are in communication with the RFID recognition and control component, so as to be able to transmit the sensed/detected information thereto.

The sensory detection means may be any type of sensor. Preferably, the sensory detection means 23 are one or more of a microphone (audio detector), camera (such as a digital still camera or video camera, etc.), temperature sensor (such as a thermometer, IR camera, heat sensor, etc.), distance sensor (to, for example, detect the distance of an interrogation source (RFID tag) from the RFID reader), ocular detection and tracking means (operable to detect and track a targets line of sight), and tactile sensors (such as a touch-sensitive screen, a button, a switch, etc.). Further, preferably, the one or more RFID readers 3 in the system is triggered by one or more of the sensory detection means 23, and/or the one or more sensory detection means 23 are triggered by the one or more RFID readers 3.

The electronic data collection system 1 of the second main embodiment, as described above, further comprises a user identity and presentation data correlation component capable of correlating the identity of a system participant to data sets (which may include, for example, product advertising/presentation data), and presenting (transmitting) data to the system participant in any desired manner, including real time video and audio presentation, E-mail transmissions, etc. In addition, the user identity and presentation data correlation component may compile user reports, in which information is provided to the user useful in communicating, for example, pertinent advertising material to the system participant.

To achieve the objects of the second main embodiment, as described above, the user identity and presentation correlation component comprises computer usable program code operable to associate the detected sensory information with one or more detected RFID tags. Further, computer usable program code is provided, which is operable to associate the detected RFID tags with one or more assigned users thereof. This function allows the program to determine the identity of individuals associated with RFID tags. Then, the program correlates the detected sensory information with associated presentation data. This function enables the program to, for example, determine what presentation data correlates to the sensor that detected the system participant. Finally, the program correlates the system participants associated the detected RFID tags with the presentation data associated with the sensory information. Thus, the program is able to determine what presentation data the system participant viewed, was interested in, etc.

For example, the program may determine, via the RFID reader 3, that a particular RFID tag 5 or 17 is present in a certain convention presentation area. Further, sensory information may be received from a touch-activated screen (tactile sensor) 31 positioned adjacent an advertising presentation 15 within a convention presentation area showing that the tactile sensor was activated (touched) at approximately the same time that the detected RFID tag was detected in the certain convention presentation area. Thus, the program determines that the detected RFID tag (i.e., interrogation source) is associated with the activated tactile sensor.

The program then determines that system participant X is an assigned user of the detected RFID tag. The program then, based on the tactile sensory information, determines that product Y advertising presentation is in communication, positioned adjacent to, and/or integrated with the activated tactile sensor. Lastly, the program correlates system participant X to product X presentation data, thereby determining that system participant X entered the certain convention presentation area at time T, and exhibited interest in product Y presentation data.

In a preferred embodiment, the user identity and presentation data correlation component described above is further operable to compile a visitor report accessible by system users, based on the detected sensor and RFID reader data. In particular, the user report comprises the identities of system participants detected in the area of the system, as well as presentation data associated with each identified system participant. Further, the program may transmit the visitor report to one or more assigned users, in any fashion, including E-mail transmission, hard copy print out, mobile device text message, etc. This flexibility enables system users to obtain user reports in any form desired, as well as any time frame. Thus, the system is highly flexible, and able to provide users with visitor reports in time to, for example, contact potential customers, direct highly targeted advertising based on exhibited interest, etc.

In a further preferred embodiment according to the first and second main embodiments of the present invention described above, a video/audio display means 35 is provided in communication with the radio frequency identification (RFID) recognition and control component. This video/audio display means may be any conventional means of displaying video data and/or communicating audio data, such as an LCD screen with integrated speakers, conventional CRT tube, video projector, etc. Further, computer usable program code is provided, which is operable to compare the detected sensory information to a database file of stored graphic and audio data stored on the portable and/or internal data storage device.

The program then determines what graphic and audio data correlates to the detected sensory information, and transmits same to a system participant. For example, a system user may input (store) predetermined advertising information, such as a video demonstration of a particular product, and store same as a data file related to a particular touch-sensitive screen. Thus, when a system participant touches the touch-sensitive screen, the program transmits a command to display the video demonstration of the particular product on the video display means, thereby targeting the system participant with particular advertising without the system participant being cognizant of the connection. Further, the system is operable to record the identity of the system participant via the RFID reader interrogation of the RFID tag worn by the system, thereby determining exactly which system participant viewed which particular advertising material.

As illustrated in FIG. 3, the present invention further provides a data collection method comprising establishing one or more data collector operational parameters, the parameters being comprised of RF (radio frequency) power level, read range, permitted interrogation sources, scan delay, desired data type, run state (auto or manual) and time zone. Although, preferably, the data collector is solely an RFID-reader, the data collector may be one or more of an RFID reader, wireless communication means, ethernet, zigbee, USB communication with an external computing device, and serial communication. In such a case, the parameters are tailored to the operation of the particular data collector.

Then, one or more data files are established. Thereafter, desired data types and/or formats are established to be stored in each data file. One or more data collection reads (by the RFID readers) are then initiated corresponding to the one or more data collection reader operational parameters. Finally, the data collected is stored in the one or more data files.

In a preferred embodiment, the method further comprises establishing data fields within each data file, thereby enabling a user of the method to organize the collected data therein on a higher level. Further, preferably, the method comprises converting the stored data into other data types and/or formats. For example, the stored data may be converted a format suitable for integration in an MS Excel file, Linus operating system, etc.

In a further preferred embodiment, the data collection method further comprises the steps of storing exhibit information (such as presentation data) and characteristics thereof, including location and subject matter thereof, determining which stored exhibit information corresponds to detected sensory information, and compiling a user report comprising exhibit information viewed and/or requested by the interrogation source.

Although specific embodiments of the present invention have been disclosed herein, those having ordinary skill in the art will understand that changes can be made to the specific embodiments without departing from the spirit and scope of the invention. Thus, the scope of the invention is not to be restricted to the specific embodiments. Furthermore, it is intended that the appended claims cover any and all such applications, modifications, and embodiments within the scope of the present invention

LIST OF DRAWING ELEMENTS

1: electronic data collection system
3: RFID reader
5: passive or active RFID tags
7: radio frequency identification (RFID) recognition and control component
9: storage device interface
11: data storage device
13: antenna
15: advertising presentation
17: user-wearable badge containing RFID tag
23: sensory detection means
25: remote source
29: graphical user display
31: tactile sensor
35: video display
What is claimed is:

1. An electronic data collection system comprising:
   (a) one or more RFID readers operable to obtain/receive electronic data from passive and/or active RFID tags;
   (b) a radio frequency identification (RFID) recognition and control component operable to control operation of the RFID readers, receive information transmitted from an RFID tag, selectively filter/convert said received information according to a preset configuration command set, and transmit the filtered/converted information, said RFID recognition component in communication with one or more of said RFID readers;
   (c) a storage device interface in communication with the RFID recognition and control component;
   (d) a portable and/or internal data storage device in communication with the storage device interface;
   (e) one or more antennas in communication with the one or more RFID readers;
   (f) a configuration and command component operable to compile a configuration command set readable by the RFID recognition and control component, said configuration command set comprised of one or more RFID operation parameters and one or more data format types;
   (g) one or more sensory detection means operable to collect detected sensory information; and
   (h) a user identity and presentation data correlation component operable to associate the detected sensory information with at least one RFID tag of the passive and/or active RFID tags and associate the detected sensory information with presentation data, in order to correlate identify of at least one participant associated with the at least one RFID tag associated with the detected sensory information with the presentation data associated with the detected sensory information.

2. The electronic data collection system of claim 1, further comprising a data storage medium in communication with the RFID recognition and control component.

3. The electronic data collection system of claim 1, further comprising a geographic location determination means in communication with the RFID recognition and control component, said geographic location determination means operable to determine a location of the one or more RFID readers.

4. The electronic data collection system of claim 3, wherein the geographic location determination means is selected from the group consisting of a GPS, a triangulation device, an optical device, a magnetic compass interface, and a location input means.

5. The electronic data collection system of claim 1, wherein the RFID recognition component comprises an electronic control and data processing module operable to execute the configuration command set in conjunction with the RFID readers.

6. The electronic data collection system of claim 1, wherein the storage drive interface is a USB drive interface.

7. The electronic data collection system of claim 1, wherein the portable and/or internal storage device is one or more of a USB flash drive, SD card, memory stick, and portable hard drive.

8. The electronic data collection system of claim 1, wherein the configuration command set is a computer program product comprising computer usable program code embodied on the portable and/or internal data storage device for controlling operation of the RFID readers and processing of information obtained therefrom, the computer program product comprising computer usable program code operable to:
   (a) enable establishment of one or more RFID reader operational parameters, said parameters comprised of RF (radio frequency) power level, read range, permitted interrogation sources, scan delay, desired data type, run state (auto or manual) and time zone;
   (b) enable establishment of one or more data files;
   (c) enable establishment of desired data types and/or formats to be stored in each data file; and
   (d) communicate the RFID reader operation parameters to the RFID recognition and control component.

9. The electronic data collection system of claim 8, wherein the computer usable program code is further operable to: enable establishment of data fields within each data file for organization of data therein.

10. The electronic data collection system of claim 8, wherein the computer usable program code is further operable to: convert data received from the RFID recognition and control component into other data types and/or formats.

11. The electronic data collection system of claim 1, further comprising a graphical user display in communication with the RFID recognition and control component.

12. The electronic data collection system of claim 1, wherein the portable and/or internal data storage device is operable to query the radio frequency identification (RFID) recognition and control component for a subset of the collected data.

13. The electronic data collection system of claim 1,
   wherein the one or more sensory detection means operable to collect detected sensory information are selected from the group consisting of a microphone, camera, temperature sensor, distance sensor (to detect distance of interrogation source from RFID reader), ocular detection and tracking means, and tactile sensors in communication with the RFID recognition and control component; and
   wherein the user identity and presentation data correlation component comprises:
      (i) computer usable program code operable to associate the detected sensory information with one or more detected RFID tags;
      (ii) computer usable program code operable to associate the detected RFID tags with one or more assigned users thereof;
      (iii) computer usable program code operable to correlate the detected sensory information with associated presentation data; and
      (iv) computer usable program code operable to correlate the one or more assigned users with the associated presentation data.

14. The electronic data collection system of claim 13, wherein the user identity and presentation data correlation component further comprises computer usable program code operable to compile a visitor report comprising the associated presentation data.

15. The electronic data collection system of claim 14, wherein the user identity and presentation data correlation component further comprises computer usable program code operable to transmit the visitor report to the one or more assigned users.

16. The electronic data collection system of claim 15, wherein transmission of the visitor report to the one or more assigned users is via E-mail, mobile device text message and/or hard copy.

17. The electronic data collection system of claim 13, wherein the one or more RFID readers is triggered by one or more of the sensory detection means.

18. The electronic data collection system of claim 13, wherein the one or more of the sensory detection means are triggered by the one or more RFID readers.

19. The electronic data collection system of claim 13, further comprising:

a video display means in communication with the radio frequency identification (RFID) recognition and control component; and computer usable program code operable to compare the detected sensory information to a database file of stored graphic and audio data stored on the portable and/or internal data storage device, determine correlative graphic and audio data, and communicate the determined correlative graphic and audio data to the video display means.

20. The electronic data collection system of claim 1, wherein the one or more sensory detection means operable to collect detected sensory information are selected from the group consisting of a microphone, camera, temperature sensor, distance sensor (to detect distance of interrogation source from RFID reader), ocular detection and tracking means, and tactile sensors in communication with the RFID recognition and control component; and wherein the user identity and presentation data correlation component comprises:

(i) computer usable program code operable to associate the detected sensory information with one or more detected RFID tags;

(ii) computer usable program code operable to associate the detected RFID tags with one or more assigned users thereof; and (iii) computer usable program code operable to compare the detected sensory information to a database file of stored graphic and audio data stored on the portable and/or internal data storage device, determine correlative graphic and audio data, and communicate the determined correlative graphic and/or audio data to the assigned user via video and/or audio means.

21. A data collection method comprising:

(a) establishing one or more data collector operational parameters, said parameters comprising one or more of RF (radio frequency) power level, read range, permitted interrogation sources, scan delay, desired data type, run state (auto or manual) and time zone;

(b) establishing of one or more data files;

(c) establishing desired data types and/or formats to be stored in each data file;

(d) initiating one or more data collection reads corresponding to the one or more data collection reader operational parameters;

(e) storing data collected in the one or more data collection reads;

(f) collecting detected sensory information from an interrogation source;

(g) associating the detected sensory information with one or more data sources communicating data to the data collector;

(h) associating the detected sensory information with presentation data; and (i) correlating identify of at least one participant associated with at least one data source from the one or more data sources associated with the detected sensory information with the presentation data associated with the detected sensory information.

22. The data collection method of claim 21, further comprising establishing data fields within each data file for organization of data therein.

23. The data collection method of claim 21, further comprising converting the stored data into other data types and/or formats.

24. The data collection method of claim 21, wherein the data collector is one or more of an RFID reader, wireless communication means, ethernet, zigbee, usb communication with an external computing device, and serial communication.

25. The data collection method of claim 21, wherein collecting the detected sensory information comprises:

collecting the detected sensory information from the interrogation source selected from the group consisting of audio, video, temperature, distance of interrogation source from data reader, target ocular movement and direction characteristics, and tactile sensory data.

26. The data collection method of claim 25, further comprising:

storing exhibit information and characteristics thereof, including location and subject matter thereof;

determining which stored exhibit information corresponds to detected sensory information; and compiling a user report comprising exhibit information viewed and/or requested by the interrogation source.

27. The data collection method of claim 21, further comprising:

determining the geographic location of the data collector via a manual or automatic geographic determination means.

* * * * *